(12) United States Patent
Park et al.

(10) Patent No.: US 11,094,329 B2
(45) Date of Patent: Aug. 17, 2021

(54) NEURAL NETWORK DEVICE FOR SPEAKER RECOGNITION, AND METHOD OF OPERATION THEREOF

(71) Applicants: SAMSUNG ELECTRONICS CO., LTD., Suwon-si (KR); SEOUL NATIONAL UNIVERSITY R&DB FOUNDATION, Seoul (KR)

(72) Inventors: Sangha Park, Seoul (KR); Namsoo Kim, Seoul (KR); Hyungyong Kim, Seoul (KR); Sungchan Kang, Hwaseong-si (KR); Cheheung Kim, Yongin-si (KR); Yongseop Yoon, Seoul (KR); Choongho Rhee, Anyang-si (KR); Hyeokki Hong, Suwon-si (KR)

(73) Assignees: SAMSUNG ELECTRONICS CO., LTD., Suwon-si (KR); SEOUL NATIONAL UNIVERSITY R&DB FOUNDATION, Seoul (KR)

(*) Notice: Subject to any disclaimer, the term of this patent is extended or adjusted under 35 U.S.C. 154(b) by 70 days.

(21) Appl. No.: 16/134,529

(22) Filed: Sep. 18, 2018

(65) Prior Publication Data
US 2019/0156837 A1 May 23, 2019

(30) Foreign Application Priority Data
Nov. 23, 2017 (KR) .................... 10-2017-0157507

(51) Int. Cl.
*G10L 17/00* (2013.01)
*G10L 17/18* (2013.01)
(Continued)

(52) U.S. Cl.
CPC ............. *G10L 17/18* (2013.01); *G06N 3/0454* (2013.01); *G06N 3/08* (2013.01); *G10L 17/00* (2013.01);
(Continued)

(58) Field of Classification Search
CPC combination set(s) only.
See application file for complete search history.

(56) References Cited

U.S. PATENT DOCUMENTS

| 9,230,550 B2 | 1/2016 | Hosom et al. | |
| 2013/0138436 A1* | 5/2013 | Yu ........................ | G06N 3/08 704/232 |

(Continued)

FOREIGN PATENT DOCUMENTS

KR 10-0596558 B1 7/2006

*Primary Examiner* — Vu B Hang
(74) *Attorney, Agent, or Firm* — Sughrue Mion, PLLC

(57) ABSTRACT

Provided are a neural network device and a method of operation thereof. The neural network device for speaker recognition may include: a memory configured to store one or more instructions; and a processor configured to generate a trained second neural network by training a first neural network, for separating a mixed voice signal into individual voice signals by executing the one or more instructions, generate a second neural network by adding at least one layer to the trained first neural network, and generate a trained second neural network by training the second neural network, for separating the mixed voice signal into the individual voice signals and for recognizing a speaker of each of the individual voice signals.

16 Claims, 8 Drawing Sheets

(51) Int. Cl.
*G06N 3/08* (2006.01)
*G10L 17/06* (2013.01)
*G06N 3/04* (2006.01)
*G10L 25/30* (2013.01)
*G10L 17/02* (2013.01)
*G10L 17/04* (2013.01)
*G10L 15/16* (2006.01)
*G10L 15/02* (2006.01)
*G10L 15/06* (2013.01)

(52) U.S. Cl.
CPC .............. *G10L 17/06* (2013.01); *G10L 25/30* (2013.01); *G10L 15/02* (2013.01); *G10L 15/063* (2013.01); *G10L 15/16* (2013.01); *G10L 17/02* (2013.01); *G10L 17/04* (2013.01)

(56) References Cited

U.S. PATENT DOCUMENTS

2016/0189730 A1\* 6/2016 Du ................ G10L 21/0272
704/233
2017/0178666 A1\* 6/2017 Yu ..................... G10L 25/30
2018/0018973 A1\* 1/2018 Moreno ............... G10L 17/24

\* cited by examiner

NEURAL NETWORK DEVICE FOR SPEAKER RECOGNITION, AND METHOD OF OPERATION THEREOF

CROSS-REFERENCE TO RELATED APPLICATION

This application claims priority from Korean Patent Application No. 10-2017-0157507, filed on Nov. 23, 2017 in the Korean Intellectual Property Office, the disclosure of which is incorporated herein in its entirety by reference.

BACKGROUND

1. Field

Apparatuses and methods consistent with example embodiments relate to a neural network device for speaker recognition and a method of operation thereof.

2. Description of the Related Art

A neural network refers to a computational architecture that models a biological brain. Recently, with the development of neural network technology, various kinds of electronic systems have been actively studied for analyzing input data and extracting valid information using a neural network device.

In particular, various techniques using the neural network are applied to a voice recognition field, and the performance of voice recognition or speaker recognition is improving.

SUMMARY

Provided are a neural network device for speaker recognition, and a method of operation thereof.

Additional aspects will be set forth in part in the description which follows and, in part, will be apparent from the description, or may be learned by practice of the presented example embodiments.

According to an aspect of an example embodiment, a neural network device for speaker recognition may include: a memory configured to store one or more instructions; and a processor configured to generate a trained first neural network by training a first neural network, for separating a mixed voice signal into individual voice signals by executing the one or more instructions, generate a second neural network by adding at least one layer to the trained first neural network, and generate a trained second neural network by training the second neural network, for separating the mixed voice signal into the individual voice signals and or recognizing a speaker of each of the individual voice signals.

According to an aspect of an example embodiment, a method of operating a neural network device for speaker recognition may include: generating a trained first neural network by training a first neural network, for separating a mixed voice signal into individual voice signals; generating a second neural network by adding at least one layer to the trained first neural network; and generating a trained second neural network by training the second neural network, for separating the mixed voice signal into the individual voice signals and to recognize a speaker of each of the individual voice signals.

According to an aspect of an example embodiment, provided is a non-transitory computer-readable recording medium having recorded thereon a program which, when executed by a computer, performs operations that include generating a trained first neural network by training a first neural network, for separating a mixed voice signal into individual voice signals; generating a second neural network by adding at least one layer to the trained first neural network; and generating a trained second neural network by training the second neural network, for separating the mixed voice signal into the individual voice signals and for recognizing a speaker of each of the individual voice signals.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
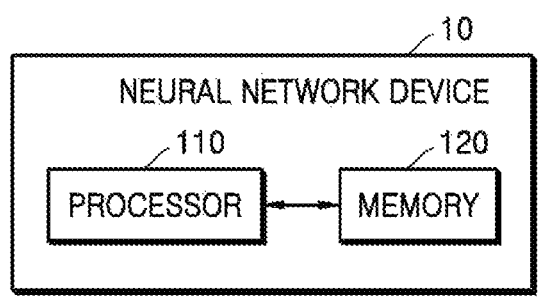
FIG. 1 is a block diagram of a hardware configuration of a neural network device according to an example embodiment.

Reference will now be made in detail to example embodiments, which are illustrated in the accompanying drawings, wherein like reference numerals refer to like elements throughout. In this regard, the present example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Throughout the specification, it will be understood that when a unit is referred to as being "connected" to another element, it may be "directly connected" to the other element or "electrically connected" to the other element in a state in which intervening elements are present. In addition, it will be understood that when a unit is referred to as "comprising" another element, it may not exclude the other element but may further include the other element unless specifically oppositely indicates.

In the present specification, the terms such as "comprise" or "include" should not be construed as necessarily including various elements or processes described in the specification, and it should be construed that some of the elements or the processes may not be included, or additional elements or processes may be further included.

It is obvious that the following embodiments do not limit or define the scope of the present disclosure. Details that are easily derivable by one of ordinary skill in the art to which the present disclosure pertains based on the detailed description and embodiments are construed as being in the scope of the present disclosure. Hereinafter, example embodiments will be described in detail with reference to the attached drawings below based on examples that are just for illustration, without limiting the present disclosure.

FIG. 1 is a block diagram of a hardware configuration of a neural network device 10 according to an example embodiment.

The neural network device 10 for speaker recognition is implemented with various types of devices such as a personal computer (PC), a server device, a mobile device, and an embedded device. In more detail, the neural network device 10 may be, but is not limited to, a smart phone, a tablet device, an augmented reality (AR) device, an Internet of things (IoT) device, an autonomous vehicle, a mobile phone, a robot, a medical device, and the like that perform voice recognition, speaker recognition, image recognition, and image classification. Further, the neural network device 10 may correspond to a dedicated hardware (HW) accelerator mounted on the above-mentioned device. The neural network device 10 may be, but is not limited to, an HW accelerator such as a neural processing unit (NPU), a tensor processing unit (TPU), a neural engine, and the like which is a dedicated module for driving a neural network.

Referring to FIG. 1, the neural network device 10 may include a processor 110 and a memory 120. Only components related to the present example embodiments are shown in the neural network device 10 of FIG. 2. Therefore, it will be understood that the neural network device 10 may further include general components other than the components in FIG. 1 by one of ordinary skill in the art.

The processor 110 controls general functions for operating the neural network device 10. For example, the processor 110 generally controls the neural network device 10 by executing one or more instructions or programs stored in the memory 120 in the neural network device 10. The processor 110 may be implemented by, but is not limited to, a central processing unit (CPU), a graphics processing unit (GPU), an application processor (AP), or the like provided in the neural network device 100.

The memory 120 is hardware for storing various data processed in the neural network device 10. For example, the memory 120 may store data processed in the neural network device 10 and data to be processed. Furthermore, the memory 120 may store applications, drivers, and the like to be executed by the neural network device 10. The memory 120 may include random access memory (RAM) such as dynamic random access memory (DRAM) or static random access memory (SRAM), read-only memory (ROM), electrically erasable programmable read-only memory (EEPROM), a compact disc read-only memory (CD-ROM), a Blu-ray or other optical disk storage device, a hard disk drive (HDD), a solid-state drive (SSD), or a flash memory.

The processor 110 may generate a first neural network trained to separate a mixed voice signal into individual voice signals. The mixed voice signal may mean a signal in which voice signals of speakers are mixed or overlapped due to simultaneous utterance of multiple human speakers. In addition, the mixed voice signal may mean a signal in which voice signals of the speakers and noise signals are mixed or overlapped. Thus, the first neural network trained by the processor 110 may separate the mixed voice signal into individual voice signals of the speakers. Furthermore, the first neural network trained by the processor 110 may separate the mixed voice signal into an individual voice signal and a noise signal of at least one speaker and may repeatedly train (learn) a given initial neural network to generate a trained neural network.

In a process of training the first neural network, the processor 110 may obtain a mixed voice signal as input information for the first neural network, and individual voice signals in the mixed voice signal as output information for the first neural network. According to an example, the processor 110 may obtain the input information and output information for the first neural network from the memory 120. According to another example, the processor 110 may obtain the input information and output information for the first neural network from an acoustic sensor in the neural network device 10.

The processor 110 may obtain a mixed voice signal of a plurality of speakers as the input information for the first neural network, and an individual voice signal of each of the plurality of speakers as the output information for the first neural network. Then, the processor 110 may train the first neural network according to the obtained input information and output information, and the trained first neural network may separate the mixed voice signal into individual voice signals. A more specific embodiment will be described below with reference to FIG. 2.

Accordingly, the processor 110 may generate a first neural network having a voice separation function through the above-described training process. Furthermore, in addition to the above-described training process, the processor 110 may generate the first neural network having the voice separation function through a training process known to one of ordinary skill in the art.

The processor 110 may add at least one layer to the trained first neural network to generate a second neural network. In a specific embodiment, the processor 110 may remove an output layer of the trained first neural network and generate the second neural network by connecting at least one hidden layer and an output layer to the trained first neural network.

The processor 110 may generate a second neural network trained to separate a mixed voice signal into individual voice signals and to recognize a speaker of each of the individual voice signals. Thus, the second neural network trained by the processor 110 may separate the mixed voice signal into the individual voice signals of the speakers, and may recognize a speaker of each of the separated individual voice signals. Furthermore, the second neural network trained by the processor 110 may also separate the mixed voice signal into at least one individual voice signal and a noise signal of the speakers and recognize a speaker of the separated individual voice signal.

In a process of training the second neural network, the processor 110 may obtain a mixed voice signal as input information for the second neural network, and speaker identification information for each of the individual voice signals in the mixed voice signal as output information for the first neural network. The speaker identification information may be a multi-class label in which a speaker of each of the individual voice signals is labeled for multi-class classification. According to an example, the processor 110 may obtain the input information and output information for the second neural network from the memory 120. According to another example, the processor 110 may obtain the input information and output information for the second neural network from the acoustic sensor in the neural network device 10.

The processor 110 may obtain a mixed voice signal of a plurality of speakers as the input information for the second neural network, and speaker identification information for each of the individual voice signals of the plurality of speakers as the output information for the second neural network. Then, the processor 110 may train the second neural network according to the obtained input information and output information, and the trained second neural network may separate the mixed voice signal into individual voice signals and recognize a speaker of each of the individual voice signals. In addition, since the output information is a multi-class label in which a plurality of speakers are labeled during the training, the trained second neural network may have a speaker recognition function with multi-class classification. A more specific embodiment will be described below with reference to FIG. 3.

Accordingly, the neural network device 10 may generate a second neural network by adding at least one layer to a first neural network having a voice separation function, and may train the second neural network to generate a second neural network having both the voice separation function and the speaker recognition function. In addition, since the neural network device 10 continuously performs first training for voice separation and second training for voice separation and speaker recognition for the neural network, the neural network is trained to perform voice separation to increase a success rate of the speaker recognition. Therefore, the neural network device 10 may generate a neural network capable of recognizing a plurality of speakers with high performance.

The processor 110 may register a speaker using the trained second neural network. In more detail, the processor 110 may obtain a speaker's voice signal. The processor 110 may then use the trained second neural network to obtain feature information for speaker recognition about the speaker's voice signal. For example, the processor 110 may extract an output vector of the last hidden layer of the trained second neural network, in which information about the speaker's voice signal is input, and may obtain feature information for speaker recognition about the speaker's voice signal. In addition, when the information about the speaker's voice signal is input to the second neural network trained in the form of a plurality of frames, the processor 110 may extract the output vector of the last hidden layer of the second neural network for each of the plurality of frames and obtain an average vector value of the output vectors of the plurality of frames as the feature information for speaker recognition.

Thereafter, the processor 110 may store the speaker identification information together with the feature information for speaker recognition in the memory 120 to register a speaker. A more specific embodiment will be described below with reference to FIG. 4.

The processor 110 may recognize at least one speaker of a mixed voice signal using the trained second neural network.

First, the processor 110 may obtain a mixed voice signal. Next, the processor 110 may use the trained second neural network to obtain feature information for speaker recognition about at least one individual voice signal included in the mixed voice signal. In more detail, when the processor 110 inputs information about the mixed voice signal to the trained second neural network, the trained second neural network separates the mixed voice signal into at least one individual voice signal and recognizes a speaker of the individual voice signal. Here, the processor 110 may extract the output vector of the last hidden layer of the trained second neural network to obtain feature information for speaker recognition about at least one individual voice signal included in the mixed voice signal.

Thereafter, the processor 110 may compare the feature information for speaker recognition about at least one individual voice signal with pre-registered feature information for speaker recognition to recognize at least one speaker of at least one individual voice signal included in the mixed voice signal. In more detail, the processor 110 may use a method such as cosine similarity, probabilistic linear discriminant analysis (PLDA), or the like as a method for determining the degree of similarity between pieces of feature information. Thus, the processor 110 may recognize which of the speakers' individual voice signals are mixed in the mixed voice signal. A more specific embodiment will be described below with reference to FIG. 5.

Therefore, since the neural network device 10 uses a neural network having both a voice separation function and a speaker recognition function, it is possible to reduce the time required for voice separation and speaker recognition. Therefore, the neural network device 10 may be operated even in a real-time operating environment.

Figure 2:
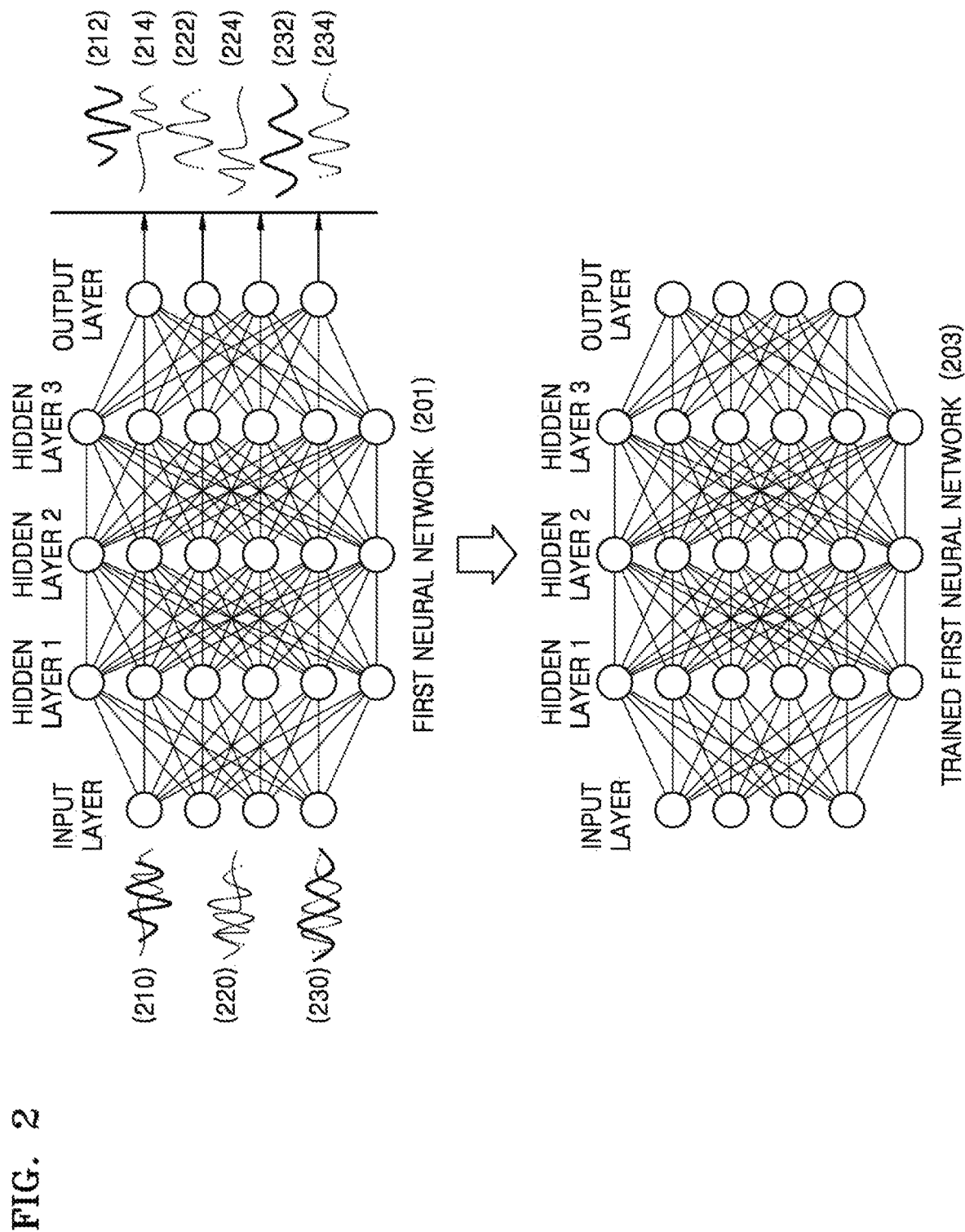
FIG. 2 is a view of an example embodiment in which a processor trains a first neural network.

FIG. 2 is a view of an example embodiment in which a processor trains a first neural network 201.

The processor 110 may generate the first neural network 201 including an input layer, hidden layers 1 to 3, and an output layer. FIG. 2 shows, but is not limited to, a deep neural network as an example of the first neural network 201. The first neural network 201 may also be a convolution neural network or a recurrent neural network as a variation of the deep neural network and may be a neural network that is a variation of other deep neural networks. Furthermore, the number of nodes, the number of hidden layers, and the like constituting each layer of the neural networks shown in FIGS. 2 to 5 are merely examples, and are not limited thereto.

The processor 110 may train the first neural network 201 so that the first neural network 201 separates a mixed voice signal into individual voice signals. Specifically, while training the first neural network 201, the processor 110 may obtain information about a mixed voice signal 210 as input information for the first neural network 201, and may obtain information about individual voice signals 212 and 214 as output information for the first neural network 201. In an example embodiment, the processor 110 may set a feature of the mixed voice signal 210 as a value of an input layer of the first neural network 201 and determine a feature of each of the individual voice signals 212 and 214 as the value of the output layer of the first neural network 201. For example, the processor 110 may use log energy and power by frequency band of the mixed voice signal 210 and the individual voice signals 212 and 214 to extract the features of the mixed voice signal 210 and the individual voice signals 212 and 214.

Therefore, the processor 110 may train the first neural network 201 through the mixed voice signal 210 and the individual voice signals 212 and 214. In other words, the first neural network 201 may learn that the mixed voice signal 210 is separated into the individual voice signals 212 and 214 through the training by the processor 110.

Similarly, the processor 110 may train the first neural network 201 through a mixed voice signal 220 and individual voice signals 222 and 224, and may also train the first neural network 201 through a mixed voice signal 230 and individual voice signals 232 and 234. Therefore, the processor 110 may train the first neural network 201 through the mixed voice signal 210, 220, and 230 and the individual voice signals 212, 214, 222, 224, 232, and 234. Thus, a first neural network 203 trained by the processor 110 may separate a mixed voice signal into individual voice signals.

Figure 3:
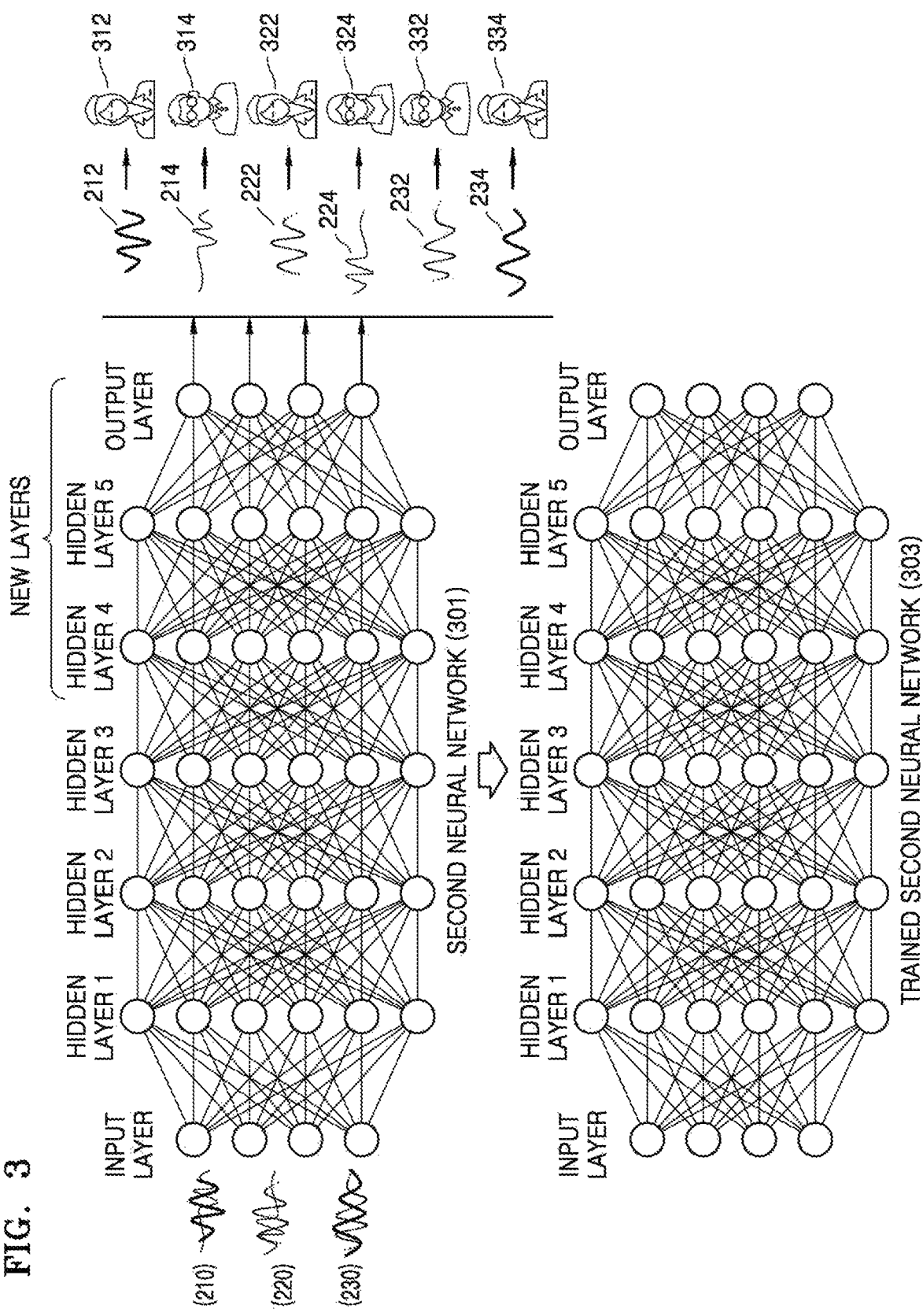
FIG. 3 is a view of an example embodiment in which a processor trains a second neural network.

FIG. 3 is a view of an example embodiment in which the processor 110 trains a second neural network 301.

The processor 110 may add at least one layer to the trained first neural network 203 of FIG. 2 to generate the second neural network 301. As shown in FIG. 3, the processor 110 may remove an output layer of the trained first neural network 203 and simultaneously connect two new hidden layers (hidden layers 4 and 5) and a new output layer to the trained first neural network 203 to generate the second neural network 301.

The processor 110 may then train the second neural network 301 such that the second neural network 301 separates a mixed voice signal into individual voice signals and recognizes speakers of the individual voice signals.

Specifically, while training the second neural network 301, the processor 110 may obtain information about the mixed voice signal 210 as input information for the second neural network 301. Furthermore, the processor 110 may obtain speaker identification information 312 and 314 for each of the individual voice signals 212 and 214 as output information for the second neural network 301. In other words, the processor 110 may obtain the speaker identification information 312 and 314 about each of the individual voice signals 212 and 214 uttered by first and second speakers. Thus, the processor 110 may train the second neural network 301 via the information about the mixed voice signal 210 and the speaker identification information 312 and 214 about the individual voice signals 212 and 214. In other words, the second neural network 301, through training by the processor 110, may separate the mixed voice signal 210 into the individual voice signals 212 and 214, and may learn to recognize a speaker of each of the individual voice signals 212 and 214.

Similarly, the processor 110 may train the second neural network 301 via speaker identification information 322 and 324 on the mixed voice signal 220 and the individual voice signals 222 and 224. Similarly, the processor 110 may train the second neural network 301 via speaker identification information 332 and 334 on the mixed voice signal 230 and the individual voice signals 232 and 234. Similarly, the processor 110 may train the second neural network 301 via speaker identification information 312, 314, 322, 324, 332, and 334 on the mixed voice signal 210, 220, and 230 and the individual voice signals 212, 214, 222, 224, 232, and 234. Thus, a second neural network 303 trained by the processor 110 may separate a mixed voice signal into individual voice signals, and may recognize speakers of the individual voice signals. FIG. 3 shows that input information of the second neural network 301 is the same as input information of the first neural network 201 of FIG. 2, but is not limited thereto. The input information of the second neural network 301 may be different from the input information of the first neural network 201 of FIG. 2.

Figure 4:
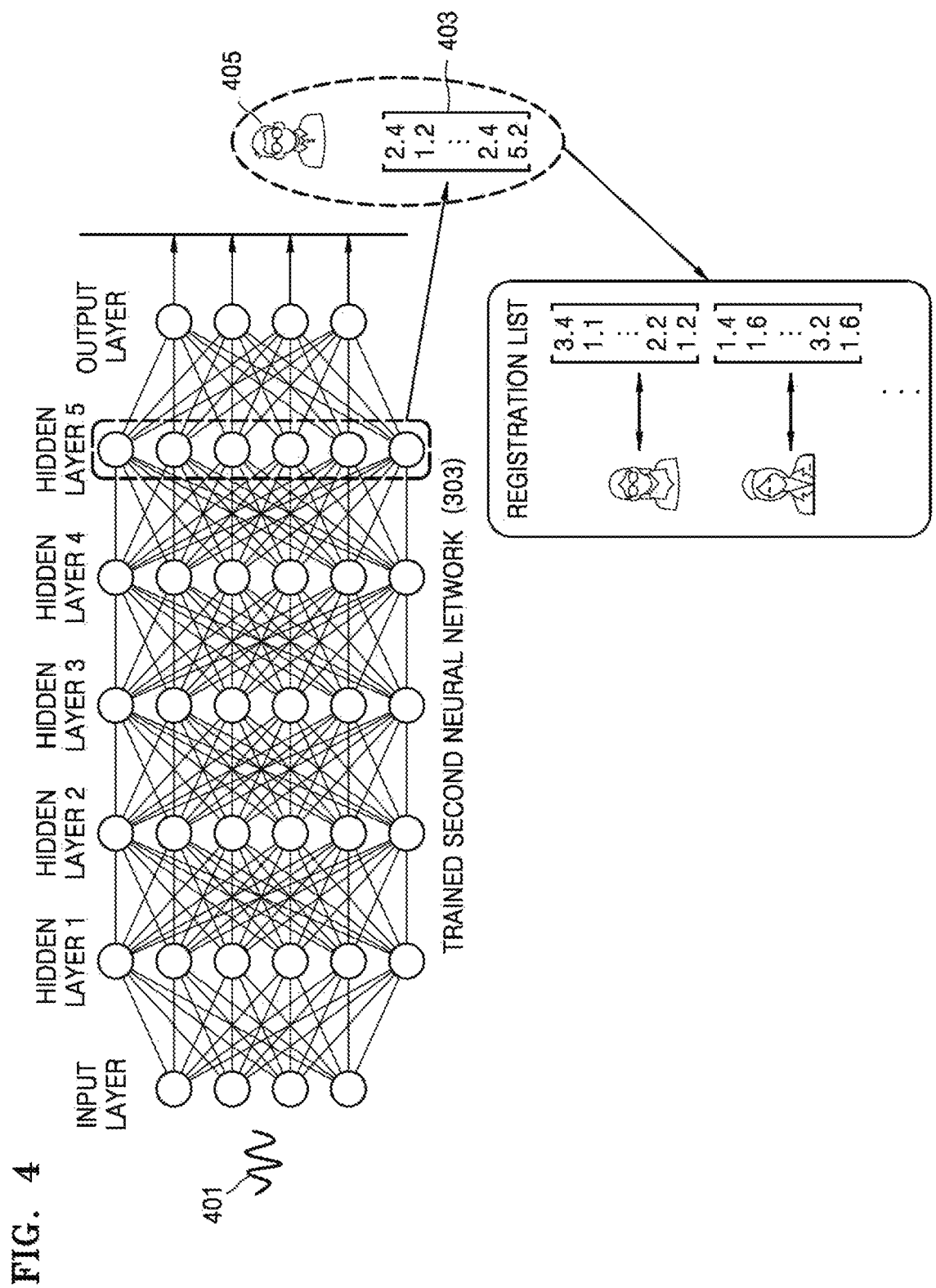
FIG. 4 is a view of an example embodiment in which a processor registers a speaker.

FIG. 4 is a view of an example embodiment in which the processor 110 registers a speaker.

The processor 110 may register a speaker using the trained second neural network 303.

In the registration process, the processor 110 may first obtain a speaker's voice signal 401. The processor 110 may then use the trained second neural network 303 to obtain feature information 403 for speaker recognition on the speaker's voice signal 401. In more detail, the processor 110 may extract an output vector of a last hidden layer of the trained second neural network 303, in which information about the speaker's voice signal 401 is input, and may obtain the feature information 403 for speaker recognition on the speaker's voice signal 401.

Thereafter, the processor 110 may store the feature information 403 for speaker recognition together with speaker identification information 405 in the memory 120 to register a speaker, and may further update a registration list.

Figure 5:
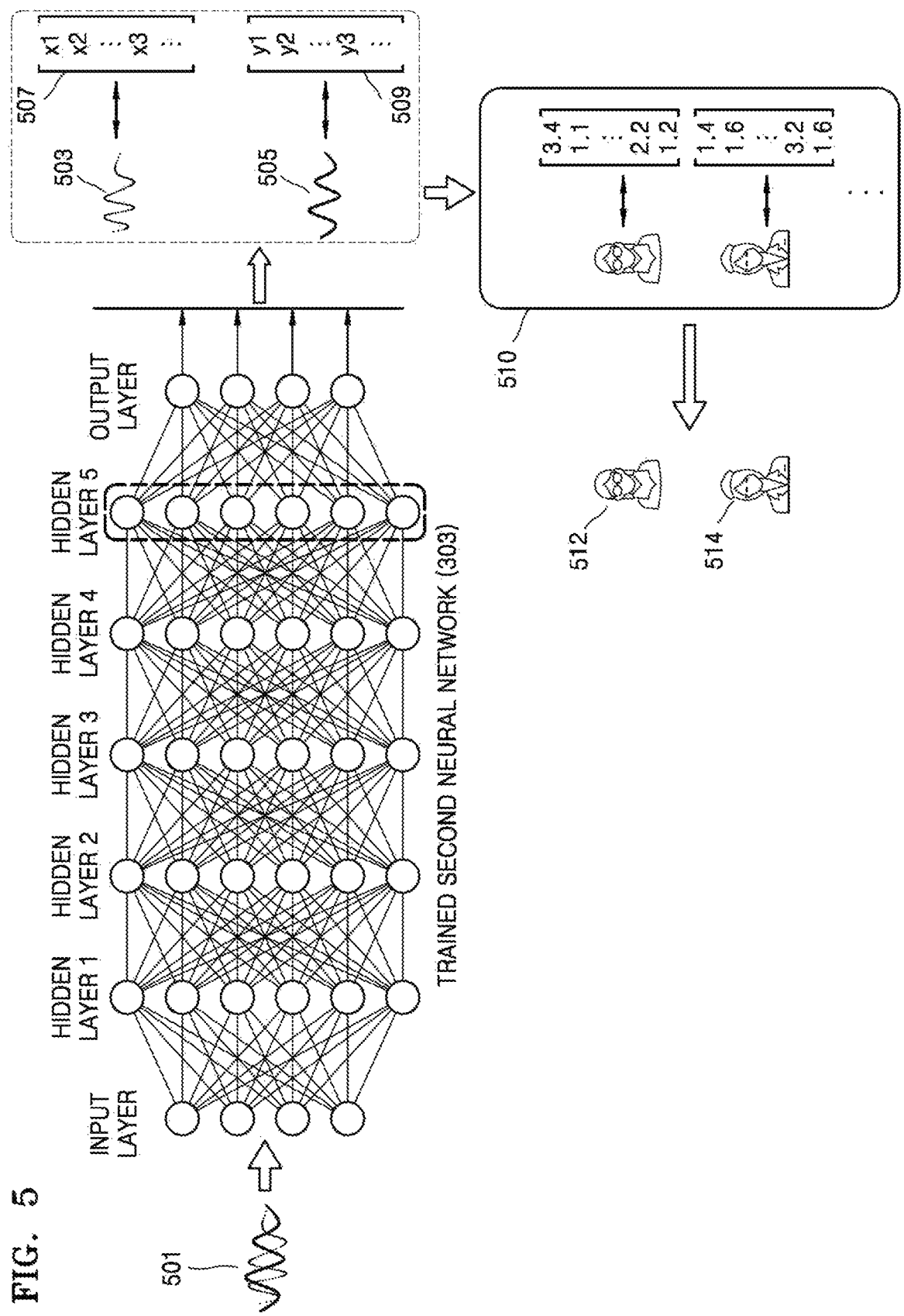
FIG. 5 is a view of an example embodiment in which a processor recognizes at least one speaker of at least one voice signal.

FIG. 5 is a view of an example embodiment in which the processor 110 recognizes at least one speaker of at least one voice signal.

The processor 110 may obtain a mixed voice signal 501. The processor 110 may then use the trained second neural network 303 to obtain feature information 507 and 509 for speaker recognition on individual voice signals 503 and 505 included in the mixed voice signal 501. In more detail, when information about the mixed voice signal 501 is input to the trained second neural network 303, the trained second neural network 303 separates the mixed voice signal 501 into the individual voice signals 503 and 505 and recognizes speakers of the individual voice signals 503 and 505. Thus, the output vector of the last hidden layer of the trained second neural network 303 may include the feature information 507 and 509 for speaker recognition on the individual voice signals 503 and 505, respectively. Therefore, the processor 110 may extract the output vector of the last hidden layer of the trained second neural network 303 to obtain the feature information 507 and 509 for speaker recognition on the individual voice signals 503 and 505, respectively.

Subsequently, the processor 110 may compare each of the feature information 507 for speaker recognition and the feature information 509 for speaker recognition with pre-registered feature information 510 for speaker recognition. Specifically, the processor 110 may confirm feature information for speaker recognition having the highest degree of similarity (e.g., above a threshold level of similarity) to the feature information 507 for speaker recognition in the pre-registered feature information 510 for speaker recognition. The processor 110 may then recognize a speaker 512 corresponding to the feature information for speaker recognition having the highest degree of similarity to the feature information 507 for speaker recognition as a speaker of the individual voice signal 503. Similarly, the processor 110 may recognize a speaker 514 corresponding to feature information for speaker recognition having the highest degree of similarity to the feature information 509 for speaker recognition in the pre-registered feature information 510 as a speaker of the individual voice signal 505.

Thus, the processor 110 may recognize the speakers 512 and 514 of the individual voice signals 503 and 505 included in the mixed voice signal 501. In other words, the processor 110 may recognize that the mixed voice signal 501 is a voice signal in which the individual voice signals 503 and 505 of the speakers 512 and 514 are mixed.

Figure 6:
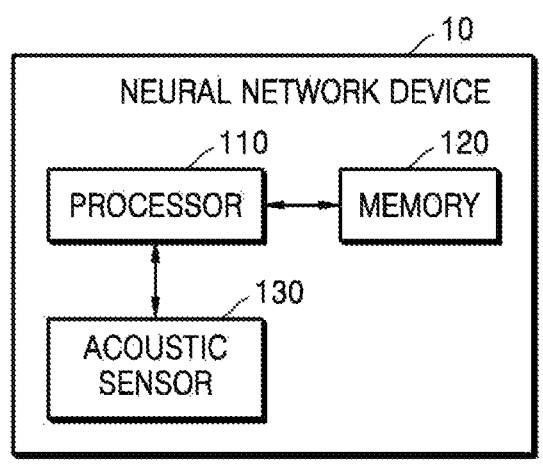
FIG. 6 is a block diagram of a hardware configuration of a neural network device, according to an example embodiment.

FIG. 6 is a block diagram of a hardware configuration of the neural network device 10, according to an example embodiment.

The neural network device 10 may further include an acoustic sensor 130 in addition to the processor 110 and the memory 120 of FIG. 1.

The acoustic sensor 130 may include at least one of a wideband microphone, a resonator microphone, and a narrow band resonator microphone array.

The acoustic sensor 130 may sense a speaker's voice signal. The processor 110 may then use a trained second neural network to obtain feature information for speaker recognition about the sensed speaker's voice signal. Thereafter, the processor 110 may store the obtained feature information for speaker recognition together with speaker identification information in the memory 120 to register a speaker.

The acoustic sensor 130 may sense a mixed voice signal. Next, the processor 110 may use the trained second neural network to obtain feature information for speaker recognition about at least one individual voice signal included in the sensed mixed voice signal. Thereafter, the processor 110 may compare the feature information for speaker recognition about at least one individual voice signal with feature information about at least one pre-registered speaker to recognize at least one speaker of the mixed voice signal.

Figure 7:
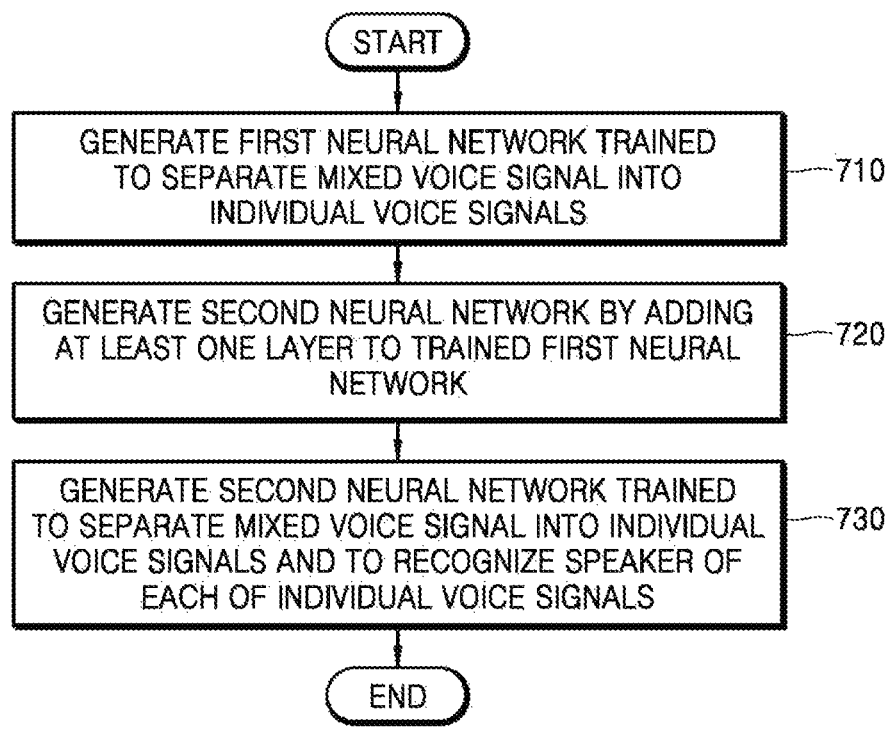
FIG. 7 is a flowchart of a method of operating a neural network device according to an example embodiment.

FIG. 7 is a flowchart of a method of operating the neural network device 10, according to an example embodiment.

The method shown in FIG. 7 may be performed by each component of the neural network device 10 of FIGS. 1 and 6, and repeated descriptions thereof will not be given herein.

In operation 710, the neural network device 10 may generate a first neural network trained to separate a mixed voice signal into individual voice signals.

The neural network device 10 may obtain information about a mixed voice signal of a plurality of speakers as input information for the first neural network and may obtain information about an individual voice signal of each of the plurality of speakers as output information for the first neural network. Thus, the neural network device 10 may generate a trained first neural network via the input information and output information for the first neural network.

In operation 720, the neural network device 10 may add at least one layer to the trained first neural network to generate a second neural network.

The neural network device 10 may remove an output layer of the trained first neural network and generate the second neural network by connecting at least one hidden layer to the output layer and an output layer to the trained first neural network.

In operation 730, the neural network device 10 may generate the second neural network trained to separate a mixed voice signal into individual voice signals and to recognize a speaker of each of the individual voice signals.

The neural network device 10 may obtain information about a mixed voice signal of a plurality of speakers as input information for the second neural network and may obtain information about an individual voice signal of each of the plurality of speakers as output information for the second neural network. Thus, the neural network device 10 may train the second neural network and generate the trained second neural network via the input information and output information for the second neural network.

Figure 8:
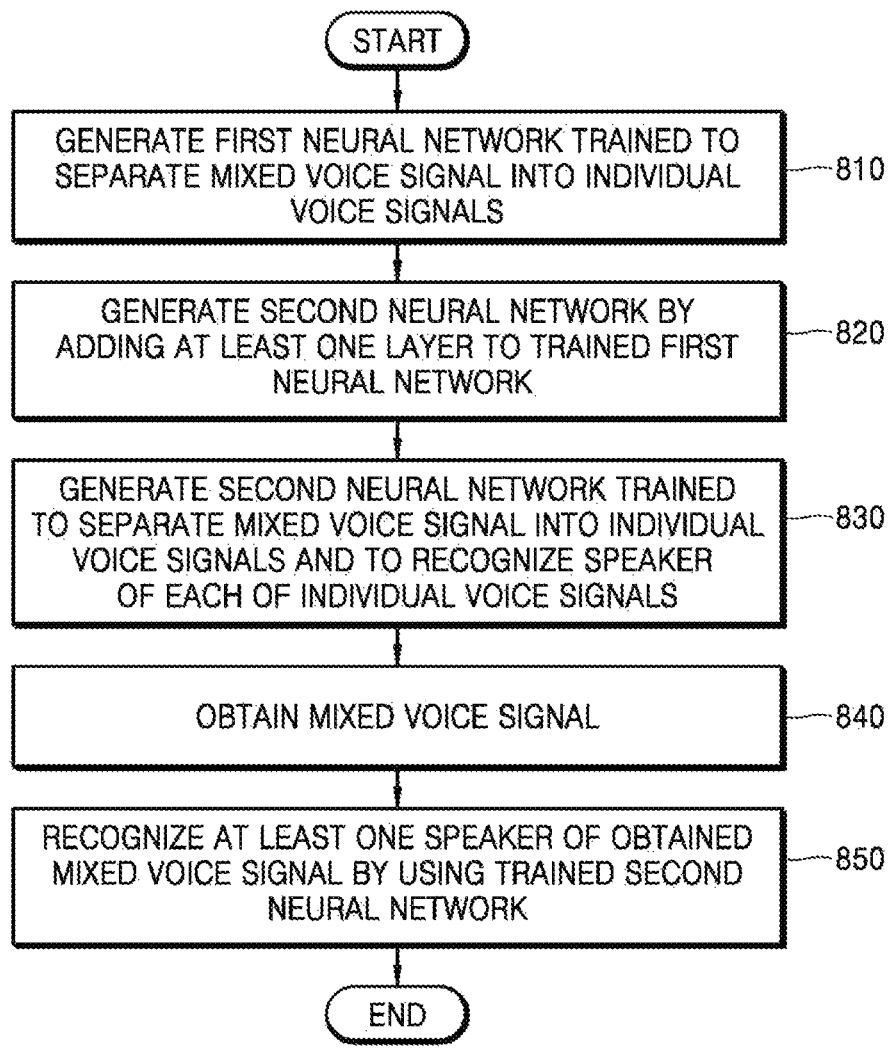
FIG. 8 is a flowchart of a method of operating a neural network device according to an example embodiment.

FIG. 8 is a flowchart of a method of operating the neural network device 10, according to an example embodiment.

The method shown in FIG. 8 may be performed by each component of the neural network device 10 of FIGS. 1 and 6, and repeated descriptions thereof will not be given herein.

In operation 810, the neural network device 10 may generate a first neural network trained to separate a mixed voice signal into individual voice signals.

In operation 820, the neural network device 10 may add at least one layer to the trained first neural network to generate a second neural network.

In operation 830, the neural network device 10 may generate the second neural network trained to separate a mixed voice signal into individual voice signals and to recognize a speaker of each of the individual voice signals.

In operation 840, the neural network device 10 may obtain a mixed voice signal. In more detail, the neural network device 10 may obtain a mixed voice signal through an acoustic sensor.

In operation 850, the neural network device 10 may recognize at least one speaker of the obtained mixed voice signal using the trained second neural network.

Next, the neural network device 10 may use the trained second neural network to obtain feature information for speaker recognition about at least one individual voice signal included in the obtained mixed voice signal. Thereafter, the neural network device 10 may compare the feature information for speaker recognition about at least one individual voice signal with pre-registered feature information for speaker recognition to recognize at least one speaker of the sensed mixed voice signal. The neural network device 10 may extract an output vector of the last hidden layer of the trained second neural network, in which information about the obtained mixed voice signal is input, and may obtain the feature information for speaker recognition about at least one individual voice signal.

Furthermore, the neural network device 10 may obtain a speaker's voice signal. In more detail, the neural network device 10 may obtain a speaker's voice signal through an acoustic sensor. The neural network device 10 may then use the trained second neural network to obtain feature information for speaker recognition on the speaker's voice signal. Thereafter, the neural network device 10 may store the obtained feature information for speaker recognition together with the speaker identification information in the memory 120 to register a speaker.

The device described herein may include a processor, a memory for storing program data and executing it, a permanent storage such as a disk drive, a communication port for handling communication with external devices, and user interface devices including a touch panel, keys, buttons, etc. When software modules or algorithms are involved, these software modules may be stored as program instructions or computer-readable code executable on a processor on a computer-readable recording medium. Examples of the computer-readable recording medium include magnetic storage media (e.g., ROM, RAM, floppy disks, hard disks, etc.), and optical recording media (e.g., CD-ROMs, digital versatile discs (DVDs), etc.). The computer-readable recording medium can also be distributed over network-coupled computer systems so that the computer-readable code is stored and executed in a distributive manner. This media can be read by the computer, stored in the memory, and executed by the processor.

The present disclosure may be illustrated by functional block formations and various processing operations. Such functional blocks may be realized by a multiple number of hardware configurations performing particular functions and/or software configurations. For example, the present disclosure may adopt IC formations such as memory, processors, logic units, and look-up tables, which can perform various functions by controlling more than one microprocessor or by other control systems. Similar to formation elements being capable of being executable by software programming or software factors, the present disclosure may be realized by programming or scripting languages such as C, C++, Java and assembler, including various algorithms realized by a combination of data structures, processes, routines or other programming formations. Functional aspects may be realized by algorithms executed in more than one processor. Functional aspects may be realized by algorithms executed in more than one processor. In addition, the present disclosure may adopt related-art technology for electronic environment set-up, signal processing, and/or data processing, etc. Terms such as "mechanism," "element," "means," and "formation" may be used, and not limited to mechanical and physical formations. The terms above may include meanings of series of routines of software related to a processor, etc.

The particular implementations shown and described herein are illustrative examples and are not intended to otherwise limit the scope of the present disclosure in any way. For the sake of brevity, conventional electronics, control systems, software development and other functional aspects of the systems may not be described in detail. Furthermore, the connecting lines or connectors shown in the various figures presented are intended to represent exemplary functional relationships and/or physical or logical couplings between the various elements. It should be noted that many alternative or additional functional relationships, physical connections or logical connections may be present in a practical device.

The use of the terms "a," "an," and "the" and similar referents in the context of describing the present disclosure (especially in the context of the following claims) are to be construed to cover both the singular and the plural. Furthermore, the recitation of ranges of values herein are merely intended to serve as a shorthand method of referring individually to each separate value falling within the range, unless otherwise indicated herein, and each separate value is incorporated into the specification as if it were individually recited herein. Also, the operations of all methods described herein can be performed in any suitable order unless otherwise indicated herein or otherwise clearly contradicted by context. The present disclosure is not limited to the described order of the operations. The use of any and all examples, or exemplary language (e.g., "such as") provided herein, is intended merely to better illuminate the example embodiments and does not pose a limitation on the scope of the present disclosure unless otherwise claimed. Numerous modifications and adaptations will be readily apparent to one of ordinary skill in the art without departing from the spirit and scope of the present disclosure.

According to the example embodiments, the network device consecutively performs first training for voice separation and second training for voice separation and speaker recognition on a neural network, thereby generating a neural network capable of recognizing a plurality of speakers with high performance.

Furthermore, according to the example embodiments, since the neural network device uses a neural network having both a voice separation function and a speaker recognition function, it is possible to reduce the time required for voice separation and speaker recognition. Therefore, the neural network device may be operated even in a real-time operating environment.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. A neural network device for speaker recognition, the neural network device comprising:
   a memory configured to store one or more instructions; and
   a processor configured, by executing the one or more instructions, to:
      generate a trained first neural network by training a first neural network, for separating a training mixed voice signal into individual voice signals,
      generate a second neural network by adding at least one layer to the trained first neural network,
      generate a trained second neural network by training the second neural network, for separating the training mixed voice signal into the individual voice signals and for recognizing a speaker of each of the individual voice signals,
   wherein the processor is further configured to add the at least one layer to the trained first neural network after the trained first neural network is generated, and
   wherein the processor is further configured to:
      obtain information about the training mixed voice signal of a plurality of speakers as input information for the second neural network,
      obtain speaker identification information for an individual voice signal of each of the plurality of speakers as output information for the second neural network,
      train the second neural network via the input information and the output information for the second neural network,
      obtain feature information for speaker recognition about at least one individual voice signal included in a candidate mixed voice signal by extracting an output vector of a last hidden layer of the trained second neural network, in which the information about the candidate mixed voice signal is input,
      compare the feature information with pre-registered feature information for speaker recognition, and
      recognize, based on a result of comparing the feature information with pre-registered feature information, at least one speaker of the candidate mixed voice signal using the trained second neural network.

2. The neural network device of claim 1, wherein the processor is further configured to:
   obtain first information about the training mixed voice signal of the plurality of speakers as input information for the first neural network,
   obtain second information about an individual voice signal of each of the plurality of speakers as output information for the first neural network, and
   train the first neural network via the input information and the output information for the first neural network.

3. The neural network device of claim 1, wherein the processor is further configured to generate the second neural network by removing a first output layer of the trained first neural network and connecting at least one hidden layer and a second output layer to the trained first neural network.

4. The neural network device of claim 1, further comprising:
   an acoustic sensor configured to sense the candidate mixed voice signal.

5. The neural network device of claim 4, wherein the acoustic sensor comprises at least one of a wideband microphone, a resonator microphone, and a narrow band resonator microphone array.

6. The neural network device of claim 1, further comprising:
an acoustic sensor configured to sense a voice signal of the at least one speaker,
wherein the processor is further configured to store the obtained feature information for speaker recognition together with the speaker identification information in the memory to register the at least one speaker.

7. A method of operating a neural network device for speaker recognition, the method comprising:
generating a trained first neural network by training a first neural network, for separating a training mixed voice signal into individual voice signals;
generating a second neural network by adding at least one layer to the trained first neural network;
generating a trained second neural network by training the second neural network, for separating the training mixed voice signal into the individual voice signals and for recognizing a speaker of each of the individual voice signals,
wherein the at least one layer is added to the trained first neural network after the trained first neural network is generated, and
wherein the method further comprises:
obtaining information about the training mixed voice signal of a plurality of speakers as input information for the second neural network,
obtaining speaker identification information for an individual voice signal of each of the plurality of speakers as output information for the second neural network,
training the second neural network via the input information and the output information for the second neural network,
obtaining feature information for speaker recognition about at least one individual voice signal included in a candidate mixed voice signal by extracting an output vector of a last hidden layer of the trained second neural network, in which the information about the candidate mixed voice signal is input,
comparing the feature information with pre-registered feature information for speaker recognition, and
recognizing, based on a result of comparing the feature information with pre-registered feature information, at least one speaker of the candidate mixed voice signal using the trained second neural network.

8. The method of claim 7, wherein the generating the trained first neural network comprises:
obtaining first information about the training mixed voice signal of the plurality of speakers as input information for the first neural network;
obtaining second information about an individual voice signal of each of the plurality of speakers as output information for the first neural network; and
training the first neural network via the input information and the output information for the first neural network.

9. The method of claim 7, wherein the generating the second neural network comprises generating the second neural network by removing an output layer of the trained first neural network and connecting at least one hidden layer to the output layer.

10. The method of claim 7, further comprising: obtaining the candidate mixed voice signal.

11. The method of claim 10, wherein the obtaining of the mixed voice signal comprises sensing the mixed voice signal using at least one of a wideband microphone, a resonator microphone, and a narrow band resonator microphone array.

12. The method of claim 7, further comprising:
obtaining a voice signal of the at least one speaker;
storing the obtained feature information for speaker recognition together with the speaker identification information in the memory to register the at least one speaker.

13. A non-transitory computer-readable recording medium having recorded thereon a program which, when executed by a computer, performs operations comprising:
generating a trained first neural network by training a first neural network, for separating a training mixed voice signal into individual voice signals;
generating a second neural network by adding at least one layer to the trained first neural network;
generating a trained second neural network by training the second neural network, for separating the training mixed voice signal into the individual voice signals and for recognizing a speaker of each of the individual voice signals
wherein the at least one layer is added to the trained first neural network after the trained first neural network is generated, and
wherein the operations further comprise:
obtaining information about the training mixed voice signal of a plurality of speakers as input information for the second neural network,
obtaining speaker identification information for an individual voice signal of each of the plurality of speakers as output information for the second neural network,
training the second neural network via the input information and the output information for the second neural network,
obtaining feature information for speaker recognition about at least one individual voice signal included in a candidate mixed voice signal by extracting an output vector of a last hidden layer of the trained second neural network, in which the information about the candidate mixed voice signal is input,
comparing the feature information with pre-registered feature information for speaker recognition, and
recognizing, based on a result of comparing the feature information with pre-registered feature information, at least one speaker of the candidate mixed voice signal using the trained second neural network.

14. The neural network device of claim 1, wherein the processor is further configured to generate the trained second neural network after generating the trained first neural network.

15. The neural network device of claim 1, wherein the processor is further configured to:
generate the trained first neural network based on a first data set comprising first output information; and
generate the trained second neural network based on a second data set comprising second output information different from the first output information.

16. The neural network device of claim 1, wherein the first output information is individual voice signal information and the second output is speaker identification information.

* * * * *